United States Patent [19]

Chubb

[11] Patent Number: 4,484,618
[45] Date of Patent: Nov. 27, 1984

[54] THERMOCHEMICAL ENERGY TRANSPORT USING A HYDROGEN RICH WORKING FLUID

[75] Inventor: Talbot A. Chubb, Arlington, Va.

[73] Assignee: The United States of America as represented by the Secretary of the Navy, Washington, D.C.

[21] Appl. No.: 377,876

[22] Filed: May 13, 1982

[51] Int. Cl.³ .............................................. F28D 15/00
[52] U.S. Cl. ................................... 165/1; 165/104.12; 126/900
[58] Field of Search ................ 165/104.12, 1; 126/900

[56] References Cited

U.S. PATENT DOCUMENTS

| | | | |
|---|---|---|---|
| 3,198,710 | 8/1965 | Long | 165/104.12 |
| 3,690,550 | 9/1972 | Hilberath | 165/104.12 |
| 3,958,625 | 5/1976 | Wentorf, Jr. | 165/104.12 |
| 3,972,183 | 8/1976 | Chubb | 165/104.12 |
| 4,109,701 | 8/1978 | Hilberath et al. | 165/104.12 |

OTHER PUBLICATIONS

T. A. Chubb, $CO_2$-$CH_4$ Reforming-Methanation Cycle, Solar Energy, vol. 24, pp. 341–345, 1980.

Primary Examiner—Albert W. Davis, Jr.
Attorney, Agent, or Firm—Robert F. Beers; William T. Ellis; Thomas E. McDonnell

[57] ABSTRACT

A thermochemical transport system for energy in which heat is transported from the point of receiving to the point of delivery by a working fluid which undergoes endothermic reaction by methane-steam reforming at the heat receiving end and exothermic methanation at the heat delivery end. The working fluid is a mixture of methane, steam, carbon monoxide, carbon dioxide, and hydrogen, for which the ratio of atomic oxygen to atomic carbon is y and the ratio of atomic hydrogen to atomic carbon is $2y+2z+4$ where y is between 1 and 5 and z is between 0.1 and 5.

13 Claims, 3 Drawing Figures

THERMOCHEMICAL ENERGY TRANSPORT USING A HYDROGEN RICH WORKING FLUID

BACKGROUND OF THE INVENTION

1. Field of Invention

The invention relates, in general, to energy transport and in particular to thermochemical energy transport.

2. Description of the Prior Art

A solar thermal power system is one type of system that uses the sun as an inexhaustible heat source. However, solar energy systems are complicated by the low density of energy in sunlight, about 1 kW/m$^2$, which necessitates large collection fields for industrially significant amounts of power. The energy gathered by the collection field must be transported to a central point where the energy is converted into electricity or used directly in an industrial process. This invention pertains to a thermochemical method of transporting thermal energy over distances of meters to many kilometers by the use of a novel working fluid. Although such an invention is particularly well-adapted to solar energy, it is to be understood that it is not limited to solar applications but is usable whenever thermal energy needs to be transported.

One of the more common approaches to heat transport involves the heating of a liquid to an elevated temperature at the receiver and cooling of the same liquid at the heat delivery end, herein called the delivery. The fluid can be liquid sodium or liquid phase water or almost any liquid. For transport of appreciable amount of energy, the temperature rise must be large. This necessitates the movement of fluids at high temperatures with the attendant problems of thermal expansion, thermal softening of piping and heat loss while the heat is delivered at relatively low temperatures, i.e. low-quality heat.

Alternatively the heat of vaporization of water can be used to absorb 2.3 kJ per gram of steam (atmospheric pressure) in the liquid-to-steam transformation at the receiver end and to deliver the same amount of energy upon condensation at the delivery. This transport process is efficient but is plagued with all the thermal problems of thermal transport by liquids. Furthermore, for energy delivery at temperature above 200° C., steam systems must use heavy high-pressure piping with severe corrosion problems.

Yet another alternative, the one with which this invention is involved, relies upon reversible chemical reactions, particularly with gaseous components. This is called a thermochemical process since heat is tied up in chemically reacting components. The endothermic reaction is supplied from the solar-energy source. The high-energy vapor phase is transported to the heat delivery where the corresponding exothermic reaction liberates the heat to be used. The vapor, the chemical composition of which is changed at each end of the system, is here called the working fluid. Such a system for thermochemical transport of energy, patented by the inventor in U.S. Pat. No. 3,972,183, uses a working fluid of sulfur trioxide, sulfur dioxide and oxygen. Because of that fluid the transport pipes of that system unfortunately are subject to corrosion if not maintained excessively free of moisture.

Another approach uses the general apparatus described in U.S. Pat. No. 3,972,183, but uses a working fluid that relies on methanation for the production of heat. The present inventor in application Ser. No. 147,412, filed on May 6, 1980, now U.S. Pat. No. 4,347,891 granted Sept. 7, 1982 discloses a methanated gas mixture which relies on the reaction $CO_2 + CH_4 \rightleftharpoons 2CO + 2H_2$. The working fluid claimed by that application is consistent with the mixture $n(CO) + m(CO_2) + CH_4$, where n is between 0 and 0.4 and m is 2 and 7. The mixture is hydrogen deficient relative to carbon and oxygen. The working fluid for these reactions can be transported at modest temperatures and pressures. However, methanation reaction at the delivery needs to be operated at a relatively low temperature, reducing the quality of the delivered heat. Furthermore, there are problems with carbon depositing on the heat exchange tubes and the methanation catalyst, thereby decreasing the efficiency of the system.

Chubb in U.S. Pat. No. 3,958,625 teaches a working fluid of $CO_2 + CH_4$ and relies on the reversible chemical reaction $CH_4 + CO_2 \rightleftharpoons 2CO + 2H_2$. For best energy transfer such a system should be operated at very high pressures, above 45 atmospheres. Such pressures require heavy expensive piping. It is also subject to the same difficulties as the present inventor's application Ser. No. 147,412.

Research carried out in Germany by the Kernforschungsanlage Julich (KFA) teaches a gas mixture consistent with $y \cdot H_2O + CH_4$ where y is any value between 1 and 5. Such a mixture is used as the working fluid in the reversible reaction, $CH_4 + H_2O \rightleftharpoons CO + 3H_2$. However, it delivers heat at a relatively low temperature and generally requires high temperature in the transport lines to prevent steam condensation. The systems described by KFA have condensed out steam before transport of the working fluid, an expensive complication.

SUMMARY OF THE INVENTION

Therefore, it is an object of this invention to transport thermal energy by a thermochemical process which uses a working fluid which can be transported at modest temperatures and pressure for long distances in inexpensive piping.

It is a further object of this invention to deliver high-temperature heat in thermochemical energy transport.

It is yet another object of this invention to reduce carbon deposition in a thermochemical energy-transport system.

These and other objects are achieved in this invention by a thermochemical transport system for energy which uses a working fluid composed of methane, steam, carbon monoxide, carbon dioxide, and hydrogen. The working fluid is characterized by the ratio of atomic oxyen to atomic carbon being y and the ratio of atomic hydrogen to atomic carbon being $2y + 2z + 4$ where y is between 1.0 and 5 and z is between 0.1 and 5. Heat absorbed at the first reaction vessel is used in the endothermic methane-steam reforming of the working fluid in which methane, carbon dioxide, and steam are reacted to become carbon monoxide and hydrogen. The working fluid, is then transported to the second reaction vessel and therein undergoes exothermic methanation, the reverse of the reforming reactions, and thereby delivers heat. The working fluid can then be recycled. Neither set of reactions is carried to completion and there is an accompanying equilibrating shift reaction between steam plus carbon monoxide and carbon dioxide plus hydrogen.

BRIEF DESCRIPTION OF THE DRAWINGS

The exact nature of this invention as well as these and other objects and advantages thereof will be readily apparent from consideration of the following specification and drawings in which.

DETAILED DESCRIPTION OF THE INVENTION

Figure 1:
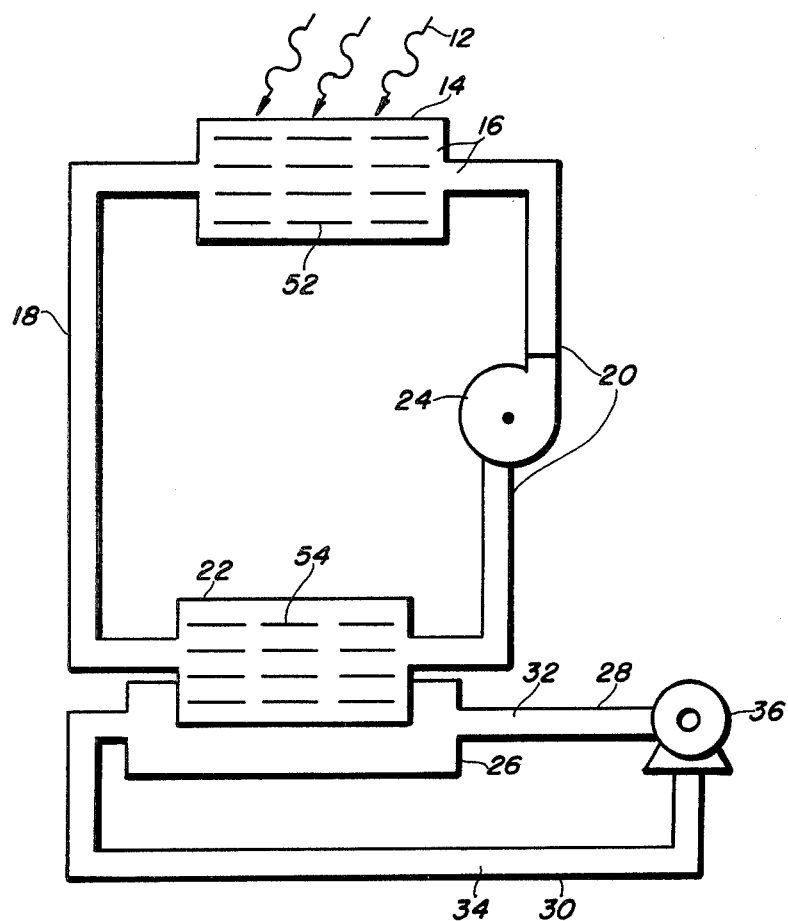
FIG. 1 is a schematic for a thermochemical transport system for energy.

Referring now to the drawings, FIG. 1 shows a thermochemical transport system for energy. Similar systems, intended for solar energy systems, are the subject of the present inventor's U.S. Pat. No. 3,972,183, and U.S. Patent application Ser. No. 147,412, filed on May 6, 1980, both of which are herein incorporated by reference. Energy 12, supplied by an external source, impinges on the receiver 14. The energy may be in the form of optical or radiant radiation, such as in solar energy, or it may be in the form of convectively conducted heat such as would be present in a nuclear reactor. The source of heat is not crucial so long as the heat is provided at a temperature above that at which the working fluid is operated. The receiver 14 shown in FIG. 1 is meant to schematically represent operational receivers, the details of which are provided by the inventor and others in their article in Modern Power Systems, July–August, 1981, page 31-34, which is incorporated herein by reference. The receiver 14 contains the working fluid 16 to be described later which is the medium for transporting the energy. Connected to the receiver are the supply pipe 18 and return pipe 20 into which the working fluid 16 in the receiver 14 is free to flow. These pipes are also connected to the delivery 22 which is the point to which the energy contained in the working fluid 16 is delivered by a process to be described later. Both the receiver 14 and delivery 22 are reactor vessels within which the working fluid is reacted. As a result of the reactions, heat is absorbed by the receiver 14 and delivered by the delivery 22. A blower 24 is included in either of the pipes 18 or 20 to physically transport the fluid. However, other means of physically transporting the working fluid 16 are possible such as pumps or a series of pressure actuated valves.

One common use of a thermal transport system is the generation of electricity. Such a use is shown in FIG. 1 in which the delivery 22 is in thermal contact with a boiler 26 connected on one side to a water return line 28 and on the other to a steam-supply line 30. The liquid water 32 supplied by the water-return line 28 is vaporized in the boiler 26 by the heat supplied by the delivery 24. The resulting steam 34, after passing through the steam supply pipe 30, drives a turbogenerator 36 which generated the electricity desired from the system. The turbogenerator includes a condenser which converts the steam 34 to water 32 and pumps it back to the boiler 26 through the water return pipe 28. It is to be understood that the heat produced by the delivery can be used for other purposes than the generation of electricity. The details of the delivery 22 depends upon the configuration of the system using the energy. Tests have been run using one element of a receiver 14 as the delivery 22.

The working fluid 16, pumped by the blower 24 through the pipes 18 and 20, is the medium by which heat is transported from the receiver 16 to the delivery 22. Its chemical composition is different in the two legs 18 and 20 of the loop although the atomic proportions of the constituent atoms remain essentially constant.

Thermochemical transport of energy relies on the chemical reaction of the working fluid 16 tying up the received heat energy. The working fluid 16 and its tied-up energy can be physically transported to the point at which heat is liberated by chemical reactions.

Because the working fluid undergoes chemical reactions, the feedstock which forms the working fluid 16 can assume many combinations of the components: $CH_4$, $CO$, $CO_2$, $H_2O$, and $H_2$. Indeed other feedstocks composed of carbon, hydrogen, and oxygen are possible. Any of the possible combinations of $CH_4$, $CO$, $CO_2$, $H_2O$, and $H_2$ will eventually settle at the equilibrium concentrations determined by their atom ratios, to be described later.

The composition of the working fluid can be generally characterized as a hydrogen-rich mixture of methane and steam. In particular the working fluid 16 can be defined as any composition of $CH_4$, $CO$, $CO_2$, $H_2O$, and $H_2$ that has the same atomic composition as the mixture $$y(H_2O) + z(H_2) + CH_4 \tag{1}$$

where y has a value between one and five and z has a value between one-tenth and five. Preferably y has a value between one and three and z has a value between one-fifth and three. More preferably y has a value between one and two and z has a value between one-fifth and two. Since methane, steam and hydrogen are not the only components in the working fluid nor the only possible feedstock, the working fluid can also be defined as any composition of $CH_4$, $CO$, $CO_2$, $H_2O$ and $H_2$ for which atomic fractions are $$\%C = 1/(3y+2z+5) \cdot 100$$

$$\%O = y/(3y+2z+5) \cdot 100 \tag{2}$$

$$\%H = (2y+2z+4)/(3y+2z+5) \cdot 100,$$

where y and z have the same range as y' and z' defined for mixture (1). Yet another way of expressing the atomic fraction given by equation (2) is that the ratio of atomic oxygen to atomic carbon is y and the ratio of atomic hydrogen to atomic carbon is $2y+2z+4$ where y and z are same as defined for equations (2).

Figure 2:
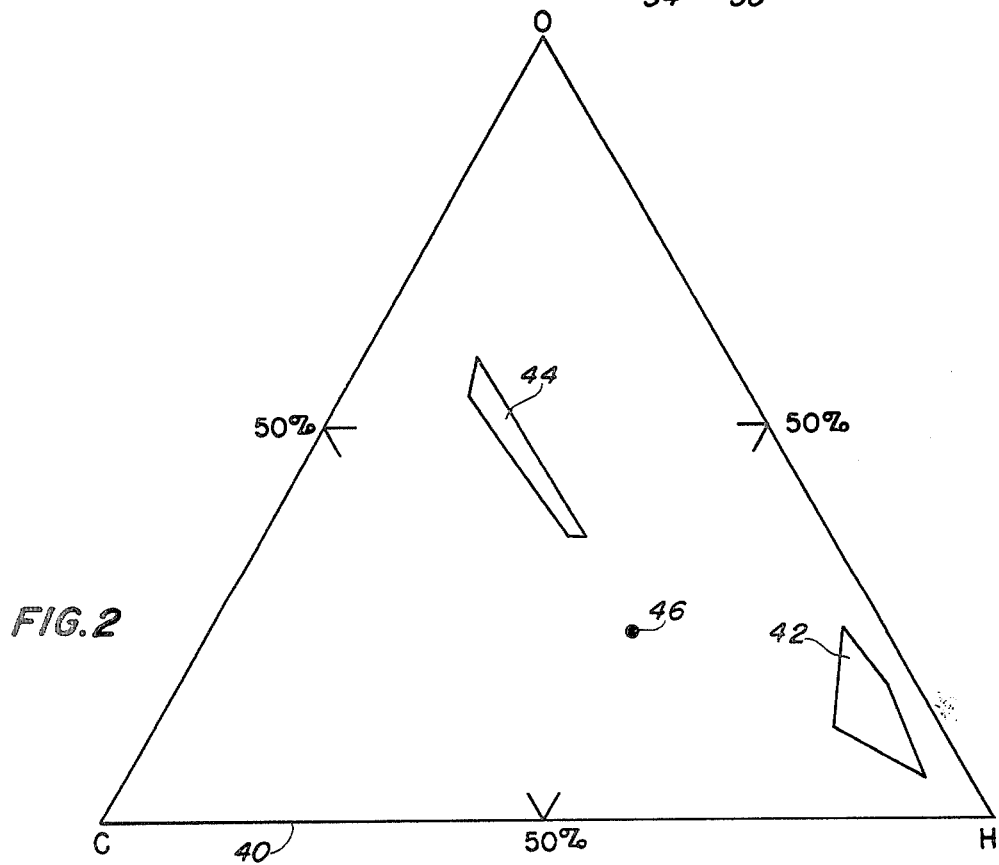
FIG. 2 is a ternary atomic partition chart.

A useful method of representing atomic ratios in a reaction ternary gas mixture is by means of the atomic partition chart as given for hydrogen, carbon and oxygen in FIG. 2. A composition at one of the vertices of the triangle would have a single component of the type with which the vertex is labelled. One side of the triangle, e.g., the bottom side 40 between C and H, represents 0% oxygen and a linear percentage scale of the components H and C with 0%H and 100%C on the left and 100%H and 0%C on the right. Higher lines parallel to the bottom side 40 represent increasing fractions of oxygen. A horizontal line midway up would represent 50% oxygen, with any point on that line giving the division of the remaining 50% between C and H.

The most broadly defined working fluid of this invention is represented by the quadrilateral 42, based either on the definitions of mixture (1) or equations (2). By way of comparison, the working fluid claimed by the inventor in his application Ser. No. 147,412 is represented by quadrilateral 44. The composition described by Wentorf in U.S. Pat. No. 3,972,183 is given by point 46.

Figure 3:
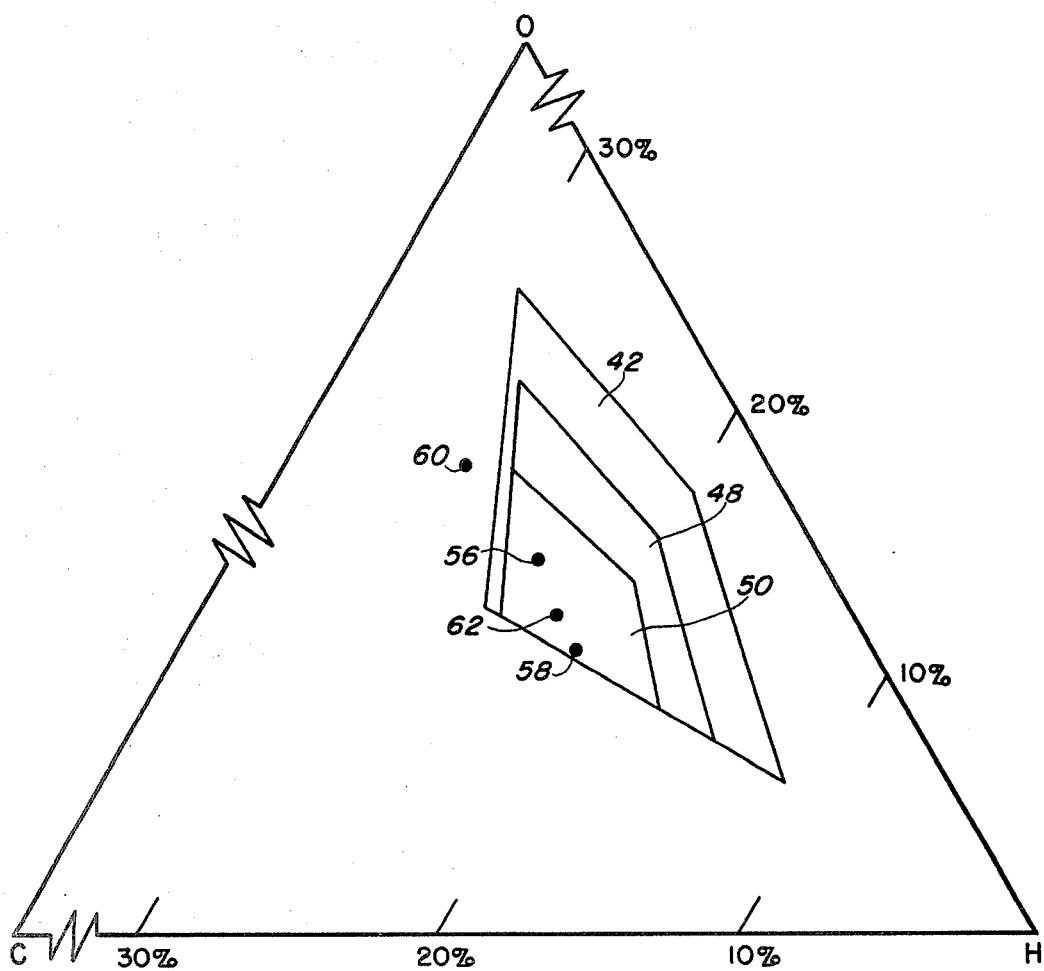
FIG. 3 is an enlargement of a portion of FIG. 2 with additional detail.

In FIG. 3 is shown an enlargement of the hydrogen corner of the tenary atomic partition chart given in FIG. 2. The working fluid 16 is defined most broadly by the quadrilateral 42. The preferably working fluid is defined by quadrilateral 48. The more preferable working fluid is represented by quadrilateral 50.

Referring again to FIG. 1, the working fluid of this invention undergoes an endothermic reaction in the receiver 14 aided by a receiver catalyst 52 within the receiver 14 and in contact with the working fluid. The heat required for the endothermic reaction is provided by the externally supplied energy 12. The working fluid 16 in its high-energy form is transported to the delivery 22 wherein an exothermic reaction, just the reverse of the receiver reaction, is aided by a delivery catalyst 54 to provide the heat delivered to the boiler 26.

In this invention the working fluid, the operating temperatures and operating pressures are chosen such that the following reversible chemical reactions occur:

$$CO_2 + CH_4 \rightleftharpoons 2CO + 2H_2 \quad (3)$$

$$H_2O + CH_4 \rightleftharpoons CO + 3H_2 \quad (4)$$

$$CO_2 + H_2 \rightleftharpoons CO + H_2O \quad (5)$$

Reactions (3) and (4) when moving toward the right, i.e., destroying $CH_4$, are called methane-steam reforming reactions (herein called reforming) and consume 61 kcal/mole and 51 kcal/mole repectively at room temperature. Reactions (3) and (4) when moving toward the left are called methanation reactions, i.e., they create methane, and release the corresponding energies mentioned above. Reaction (5), called the shift reaction, interchanges steam and $CO_2$ and absorbs 10 kcal/mole when moving to the right. Although the shift reaction is of secondary importance in heat transfer, its consideration is essential for equilibrium conditions. The present inventor's application Ser. No. 147,412 and Wentof's U.S. Pat. No. 3,972,183 both teach thermochemical transport systems relying on a single chemical reaction. In this invention, the three reactions given by (3), (4), and (5) are proceeding simultaneously. The reactivity of each reaction depends on the temperature and the partial pressure of each components. The three reactions given by (3), (4), and (5) are not independent but under full equilibrium conditions the partial pressure of the five gases $H_2$, $H_2O$, $CO$, $CO_2$ and $CH_4$, are related by the equilibration equations, viz.

$$K_6 = \frac{[CO]^2 \cdot [H_2O]^2}{[CO_2] \cdot [H_2O]} \quad (6)$$

$$K_1 = \frac{[CO] \cdot [H_2O]}{[H_2] \cdot [CO_2]} \quad (7)$$

where $K_1$ and $K_6$ are temperature and to a lesser extent pressure dependent constants, well known in the chemical arts, and are available in the JANAF Thermochemical Tables published by the National Bureau of Standards. There are also three equations describing conservation of pressure and atomic ratios.

The reactions (3), (4) and (5) have been calculated for a number of mixtures for a system operating at 4 atmospheres. In the first calculation, a feedstock of 80% $H_2$, 10% CO, and 10% $CO_2$ which is represented as point 56 on FIG. 3. The results for a receiver equilibrium temperature of 850° C. and a delivery equilibrium temperature of 650° C. are given in Table 1. The receiver operating temperature will be about 50° C. higher than the receiver equilibrium temperature while the delivery operating temperature will be about 50° C. lower than the delivery equilibrium temperature. The changes in composition reflects the methanation and the reforming of the working fluid.

TABLE 1

| Temperature | $H_2$ | $H_2O$ | CO | $CO_2$ | $CH_4$ |
|---|---|---|---|---|---|
| Mixture 80% $H_2$, 10% CO, 10% $CO_2$ | | | | | |
| 850° C. | 69.3% | 10.0 | 16.8 | 2.1 | 1.8 |
| 650° C. | 49.5% | 24.1 | 5.4 | 5.0 | 16.0 |
| Mixture 80% $H_2$, 18.5% CO, 1.5% $CO_2$ | | | | | |
| 925° C. | 76.2% | 3.0 | 18.4 | 0.5 | 1.9 |
| 725° C. | 62.6% | 12.2 | 9.7 | 2.6 | 12.9 |
| Mixture 80% $H_2$, 20% $CO_2$ | | | | | |
| 850° C. | 62.5% | 17.3 | 15.8 | 3.7 | 0.7 |
| 650° C. | 46.1% | 29.2 | 5.9 | 7.1 | 11.7 |

The gas composition in the delivery pipe 18 will be that of the high temperature composition. The composition in the supply pipe 20 will be the low temperature composition. The heat transported will be 2.7 kJ/g.

The reaction calculated for a gas mixture of 80% $H_2$, 18.5% CO and 1.5% $CO_2$, the mixture represented as point 58, produced the results given in Table 1 for the given equilibrium temperatures. The heat transported by this reaction will be 2.9 kJ/g.

A further calculation for the gas mixture of 80% $H_2$ and 20% $CO_2$ produced the results also shown in Table 1. This composition is represented by point 60 which is a composition taught by KFA although they operated the transport system at different temperatures and pressure than calculated here. The heat transported by this mixture will be 1.95 kJ/g for the equilibrium temperatures listed.

The calculations for the working fluid of this invention have shown the following advantages. The working fluid in the return pipe 18 will contain no condensables in concentration sufficient to condense out at 90° C. The mixtures will be thermodynamically stable against carbon deposition.

The calculations which produced the results of Table 1 were based on an operating pressure of 4 atmospheres absolute, receiver equilibrium temperatures between 850° C. and 925° C. and delivery equilibrium temperatures between 650° C. and 725° C. These conditions were chosen as matching an experimental demonstration to be described later but they should not be construed as being limitations on the invention. The system could operate near 1 atmosphere of pressure and at that pressure the supply and return pipes 18 and 20 can operate at lower temperature without condensation. A problem for low pressure operation is the relatively large pressure drops as the gas circulates.

Operating pressures up to 80 atmospheres appear possible although the condensation temperatures in the pipes are higher. The real limitation on pressure arises from the cost of building high-pressure piping and vessels. Simple and inexpensive plastic pipe can operate at 4 atmospheres while 10 atmospheres appears a limit to reinforced plastic. Above this pressure increasingly rugged and expensive steel construction would be required.

Computer calculations have demonstrated the feasibility of operating the invention with the receiver 14 equilibrium temperatures between 800° C. and 1150° C. Temperature ranges at the delivery 22 would be 300° C. lower.

The concentrations presented in Table 1 were based on calculations relying on the equilibrium equations (6) and (7). It has been found necessary to incorporate catalysts 52 and 54 in the receiver 14 and delivery 22 in order to hasten the methanation and reforming reactions given by (3), (4), and (5) to reach thermal equilibrium. The catalysts need not affect the equilibrium point but only increase the reaction rates. It has been found that useful catalysts are metal coatings which adsorb the gaseous reactants on their surfaces. The resulting molecular distortions promote the reactions. Since these are surface catalysts, their effectiveness can be increased by metallically coating a porous substrate in order to increase the effective catalyst area. Ruthenium and nickel have been used as effective catalysts in both methanation and reforming in this invention. Neither suffered from carbon depositing on its surface. Other catalysts for the reactions of this invention are well known, particularly metals and metalloids such as tungsten, tungsten sulfide, molybdenum, and molybdenum sulfide.

The operation of the invention has been experimentally verified for a gas mixture of 72% $H_2$, 14% $CO_2$ and 14% $CH_4$, which is represented as point 62 on FIG. 2. The system was operated at 4 atmospheres absolute. The delivery catalyst 52 was nickel on aluminum oxide in a form commonly known as a Raschig ring catalyst. The receiver catalyst 54 was ruthenium on a porous ceramic coating over a stainless steel substrate. Energy was provided by an electrically supplied glo-bar heater which supplied heat at between 900° and 950° C. The receiver 14 and delivery 22 were both made of one element of the receiver described in the previously mentioned article in Modern Power Systems. Heat from the delivery 22 was delivered to circulating air. In the tests, the receiver 14 and delivery were separated by 3 m of metal tubing in which the working fluid attained a maximum temperature of 160° C. although lower transport temperatures could easily have been achieved.

The experimental system delivered heat at 600° C. and the partial pressures of the two measured components, $CO_2$ and $CH_4$, conformed to calculated values. After 8 hours no build up of carbon on the catalysts was observed, showing that the system can be operated for extended periods of time.

Thus, it is seen that the invention provides a method of thermochemical energy transport utilizing a hydrogen-rich working fluid which uses common non-toxic feestock, does not produce complicating parallel reactions or carbon accumulations on the catalysts, operates at a reasonable pressure of four atmospheres, and while delivering heat at 600° C. can use plastic piping for vapor transport at 100° C.

Obviously many modifications and variations of the present invention are possible in light of the above teachings. It is therefore to be understood that within the scope of the appended claims the invention may be practiced otherwise than as specifically described.

What is claimed is:

1. A thermochemical transport system for energy, including two reactor vessels and means for transporting a working fluid between the reactor vessels, wherein the improvement comprises the working fluid consisting essentially of methane, steam, carbon monoxide, carbon dioxide and hydrogen, said working fluid having the same ratio of atomic hydrogen to atomic oxygen to atomic carbon as the mixture: $y(H_2O)+z(H_2)+CH_4$ where y has a value between 1 and 5 and z has a value between 0.1 and 5.

2. A thermochemical transport system for energy as recited in claim 1, wherein y has a value between 1 and 3 and z has a value between 0.2 and 3.

3. A thermochemical transport system for energy as recited in claim 1, wherein y has a value between 1 and 2 and z has a value between 0.2 and 2.

4. A working fluid for the thermochemical transport of energy by methanation and reforming consisting essentially of methane, steam, carbon monoxide, carbon dioxide and hydrogen, said working fluid having the same ratio of atomic hydrogen to atomic oxygen to atomic carbon as the mixture: $y(H_2O)+z(H_2)+CH_4$ where y has a value between 1 and 5 and z has a value between 0.1 and 5.

5. A working fluid for the chemical transport of energy by methanation and reforming, as recited in claim 4, wherein y has a value between 1 and 3 and z has a value between 0.2 and 3.

6. A working fluid for the chemical transport of energy by methanation and reforming, as recited in claim 4, wherein y has a value between 1 and 2 and z has a value between 0.2 and 2.

7. A method for transporting thermochemical energy comprising the steps of:
  supplying heat into a first reactor vessel;
  reacting the working fluid in the presence of a catalyst within the first reactor vessel to reform methane, carbon dioxide and steam in the working fluid into carbon monoxide and hydrogen, thereby absorbing heat, said working fluid consisting essentially of methane, steam, carbon monoxide, carbon dioxide and hydrogen said working fluid having the same ratio of atomic hydrogen to atomic oxygen to atomic carbon as the mixture: $y(H_2O)+z(H_2)+CH_4$ where y has a value between 1 and 5 and z has a value between 0.1 and 5;
  transporting the working fluid to a second reactor vessel; and
  reacting said working fluid in the presence of a catalyst within the second reactor vessel to methanate carbon monoxide and hydrogen into methane, carbon dioxide and steam thereby delivering heat.

8. A method for transporting thermochemical energy as recited in claim 7, wherein y has a value between 1 and 3 and z has a value between 0.2 and 3.

9. A method for transporting thermochemical energy as recited in claim 7, wherein y has a value between 1 and 2 and z has a value between 0.2 and 2.

10. A thermochemical transport system as recited in claim 1, wherein said transporting means comprises a supply pipe connected to both said reaction vessels, and further comprising a return pipe also connected to both said reaction vessels and means for forcing said working fluid to move from said receiver through the supply pipe to said delivery and therefrom through the return pipe to said receiver.

11. A thermochemical transport system for energy as recited in claim 1, further comprising:
  a reforming catalyst included in the first reaction vessel in contract with said working fluid; and a methanation catalyst included in the second reaction vessel in contact with said working fluid.

12. A thermochemical transport system for energy, as recited in claims 7 or 11, wherein said reforming catalyst is ruthenium.

13. A thermochemical transport system for energy, as recited in claims 7 or 11, wherein said methanation catalyst is nickel.

* * * * *